(12) United States Patent
Patil et al.

(10) Patent No.: US 9,471,624 B1
(45) Date of Patent: Oct. 18, 2016

(54) METHOD FOR RECOMMENDING APPLICATIONS FOR DELETION

(71) Applicant: Quixey, Inc., Mountain View, CA (US)

(72) Inventors: Sameer Patil, Santa Ana, CA (US); Eric J. Glover, Palo Alto, CA (US)

(73) Assignee: Quixey, Inc., Mountain View, CA (US)

( * ) Notice: Subject to any disclaimer, the term of this patent is extended or adjusted under 35 U.S.C. 154(b) by 206 days.

(21) Appl. No.: 14/141,164

(22) Filed: Dec. 26, 2013

(51) Int. Cl.
*G06F 17/30* (2006.01)
(52) U.S. Cl.
CPC ............................. *G06F 17/30386* (2013.01)
(58) Field of Classification Search
CPC ............... G06F 8/70; G06F 17/30575; G06F 17/30029; G06F 17/30082; G06F 21/31
See application file for complete search history.

(56) References Cited

U.S. PATENT DOCUMENTS

| | | | | |
|---|---|---|---|---|
| 2010/0017505 A1* | 1/2010 | Kamada | ..................... | G06F 8/62 709/221 |
| 2011/0320307 A1* | 12/2011 | Mehta | ................ | G06Q 30/0282 705/26.7 |
| 2012/0102145 A1* | 4/2012 | Jung | ...................... | G06Q 30/02 709/217 |
| 2013/0226937 A1* | 8/2013 | Moritz | ................ | G06F 17/3087 707/748 |
| 2013/0290318 A1 | 10/2013 | Shapira et al. | | |
| 2013/0290319 A1 | 10/2013 | Glover et al. | | |
| 2013/0290321 A1 | 10/2013 | Shapira et al. | | |
| 2013/0290322 A1 | 10/2013 | Prosnitz et al. | | |
| 2013/0290344 A1 | 10/2013 | Glover et al. | | |
| 2014/0006409 A1 | 1/2014 | Prosnitz et al. | | |

* cited by examiner

*Primary Examiner* — Angelica Ruiz
(74) *Attorney, Agent, or Firm* — Harness, Dickey & Pierce, P.L.C.

(57) ABSTRACT

Techniques for recommending deletion of applications stored on a user device. According to one aspect of the disclosure, the techniques include obtaining one or more user-specific application attributes corresponding to an application installed on the user device. The user-specific application attributes correspond to use of the application on the user device. The technique also includes determining whether to recommend deletion of the application based on at least one of the user-specific application attributes. The technique further includes providing a recommendation to delete the application by way of displaying the recommendation on a user display of the user device.

24 Claims, 10 Drawing Sheets

METHOD FOR RECOMMENDING APPLICATIONS FOR DELETION

TECHNICAL FIELD

This disclosure relates to a method for recommending applications for deletion from a user device.

BACKGROUND

User devices, such as smartphones, tablet PCs, cellular telephones, portable digital assistants, smart televisions, and smart home appliances (such as smart refrigerators) have become widespread and essential in consumers' everyday lives. These user devices include a display (e.g., touch screen or non-touch screen display) that allows the consumer to interact with the user device. User devices may be connected to the Internet and may communicate with other user devices or a service provider.

Moreover, consumers may personalize their user devices by downloading applications to their device or accessing applications via a Web-browser. These applications may accommodate tasks capable of being performed on a user device.

DESCRIPTION OF DRAWINGS

Like reference symbols in the various drawings indicate like elements.

DETAILED DESCRIPTION

User devices, such as smartphones, tablets, and wearable computers, are quickly becoming the primary devices which users operate to access network resources (e.g., web servers and application servers). Users can download applications to their user devices to leverage one or more specific functionalities of the application (e.g., a flight tracker functionality of an airline application). An application may refer to computer readable instructions that cause a computing device to perform a task. In some examples, an application may also be referred to as an "app." Examples of applications can include, but are not limited to, word processing applications, messaging applications, media streaming applications, social networking applications, e-reader applications, and games.

Applications can be executed on a variety of user devices. For example, applications can be executed on mobile computing devices, such as smart phones, tablets, and wearable computing devices (e.g., headsets and/or watches). Applications can also be executed on other types of user computing devices having other form factors, such as laptop computers, desktop computers, smart televisions, smart refrigerators, or other user devices. In some cases, applications may be installed on a user device prior to a user purchasing the device. In other cases, the user may download applications to the user device directly from the application provider and/or from an application retail store (e.g., iTunes® App Store or Google® Play).

The functionality of an application may be accessed on the user device on which the application is installed. Additionally or alternatively, the functionality of an application may be accessed via a remote computing device (e.g., a server). In some examples, all of an application's functionality is included on the computing device on which the application is installed. These applications may function without communication with other computing devices (i.e., offline). In other examples, an application installed on a computing device may access information from other remote computing devices during its execution. For example, a weather application installed on a computing device may access the latest weather information from an application server and display the accessed weather information to the user through the installed weather application. An application (e.g., a Web based application) may also be partially executed by the user device and partially executed by a remote computing device. For example, a Web application may be an application that is executed, at least in part, by a Web server and accessed by a Web browser of the user device.

Figure 1:
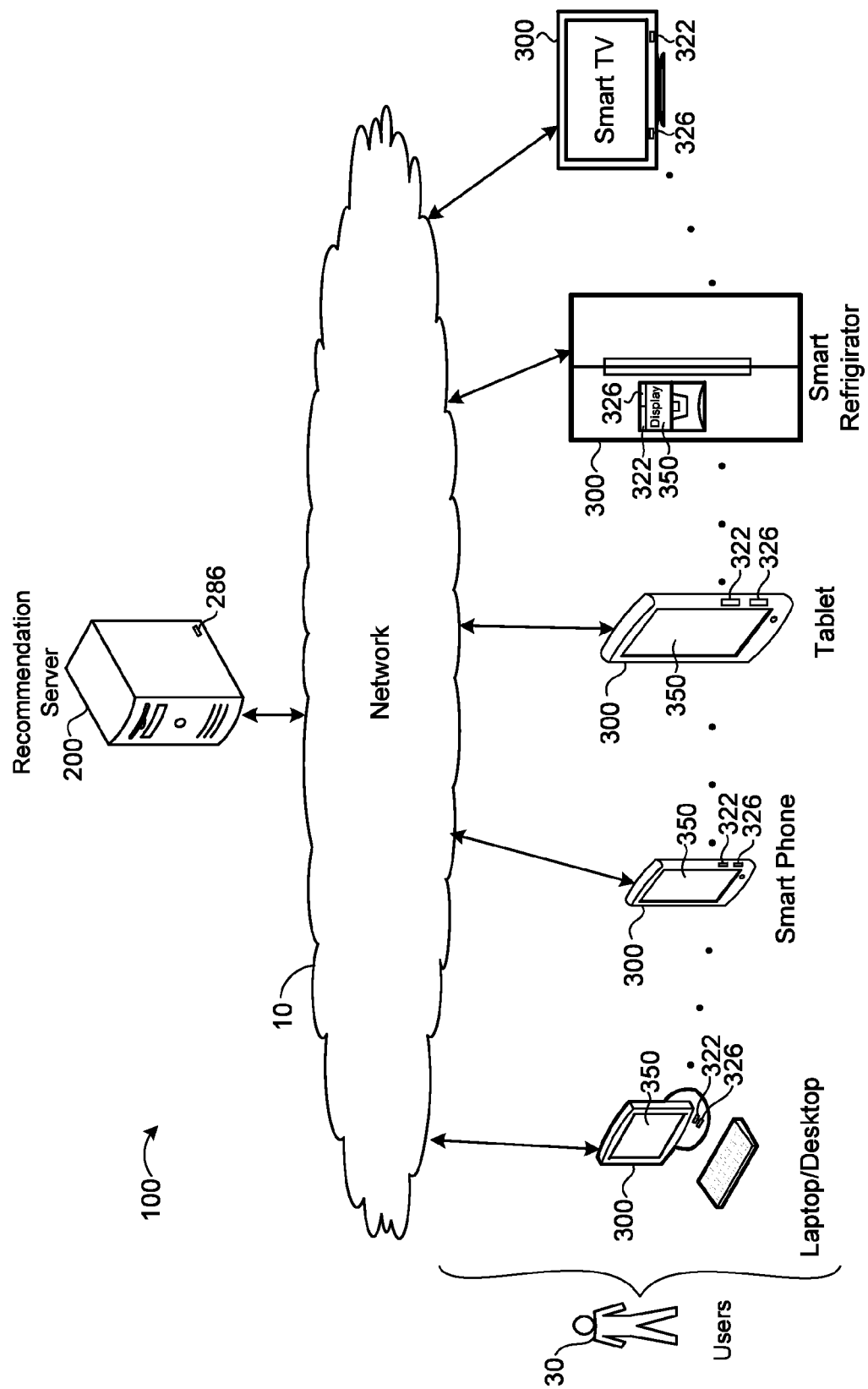
FIG. 1 is a drawing illustrating a recommendation system configured to recommend applications for deletion.

FIG. 1 depicts an example recommendation system 100 including one or more recommendation servers 200 and one or more user devices 300. Through the normal use of a user device 300, a user 30 may download several applications 322 to the user device 300. Subsequently, the user 30 may lose track of the number of applications 322 and which exact applications 322 are installed on the device 300. The user 30 may find it cumbersome to sort through a list of applications 322 on the device 300 and determine which applications 322 the user 30 wants to delete. Deleting an application 322 from a device 300 can refer to the process by which the application 322 is permanently removed from the device 300 and clearing some or all of the data related to the application 322, thereby increasing the available memory of the device 300. Available memory can refer to a portion of a total memory of a user device 300 capable of storing files or applications 322.

As shown, the recommendation system 100 includes a recommendation server 200 and user devices 300 that communicate over a network 10. The network 10 may include any type of network that allows sending and receiving of communication signals, such as a wireless telecommunication network, a cellular telephone network, a time division multiple access (TDMA) network, a code division multiple access (CDMA) network, global system for mobile communications (GSM), a third generation (3G) network, fourth generation (4G) network, a satellite communications network, and other communication networks. The network 10 may include one or more of a Wide Area Network (WAN), a Local Area Network (LAN), and a Personal Area Network (PAN). In some examples, the network 10 includes a data network, a telecommunication network, or a combination of data and telecommunication networks.

In some implementations, the recommendation server 200 is configured to monitor usage patterns of each application 322 installed by the user 30 on the user device 300 to trigger periodic recommendations for deletion. The recommendation server 200 considers application attributes 286 specific to the application in general and user-specific attributes 326 received from the user device 300 to determine which applications 322 to recommend for deletion and/or addition. Application attributes 286 can refer to attributes of the application 322 in general (e.g., a name of the application 322, a size of the application 322, an expected usage frequency of the application 322, an actual usage frequency of the application 322, and a geographic relevance of the application 322). User-specific attributes 326 can refer to attributes of the user device 300 and/or to specific instances of an application installed on the user device 300. User-specific attributes 326 can include, but are not limited to, a data usage attribute (i.e., how much data the installed instance of the application 322 is using), a usage-frequency attribute (i.e., how many times the user 300 uses the application 322 over a period of time), a time of last use attribute (i.e., when the user last launched the application 322), a time of download attribute (i.e., when the application 322 was installed on the user device 300), an available disk space attribute (i.e., how much disk space is currently available on the user device 300), and/or a geographic location attribute (i.e., where the user device 300 is currently located).

When the recommendation server 200 determines that one or more applications 322 should be recommended for deletion, the recommendation server 200 provides the deletion recommendations to the user device 300. The user device 300 can display the deletion recommendations to the user 30, whereby the user 30 can make a decision whether or not to delete one or more of the applications 322. Additionally, in some implementations, when the user 30 elects to delete an application 322 that the recommendation server 200 recommended for deletion, the recommendation server 200 can recommend substitute applications 322 that the user 30 may be interested in downloading to the user device 300.

Figure 2A:
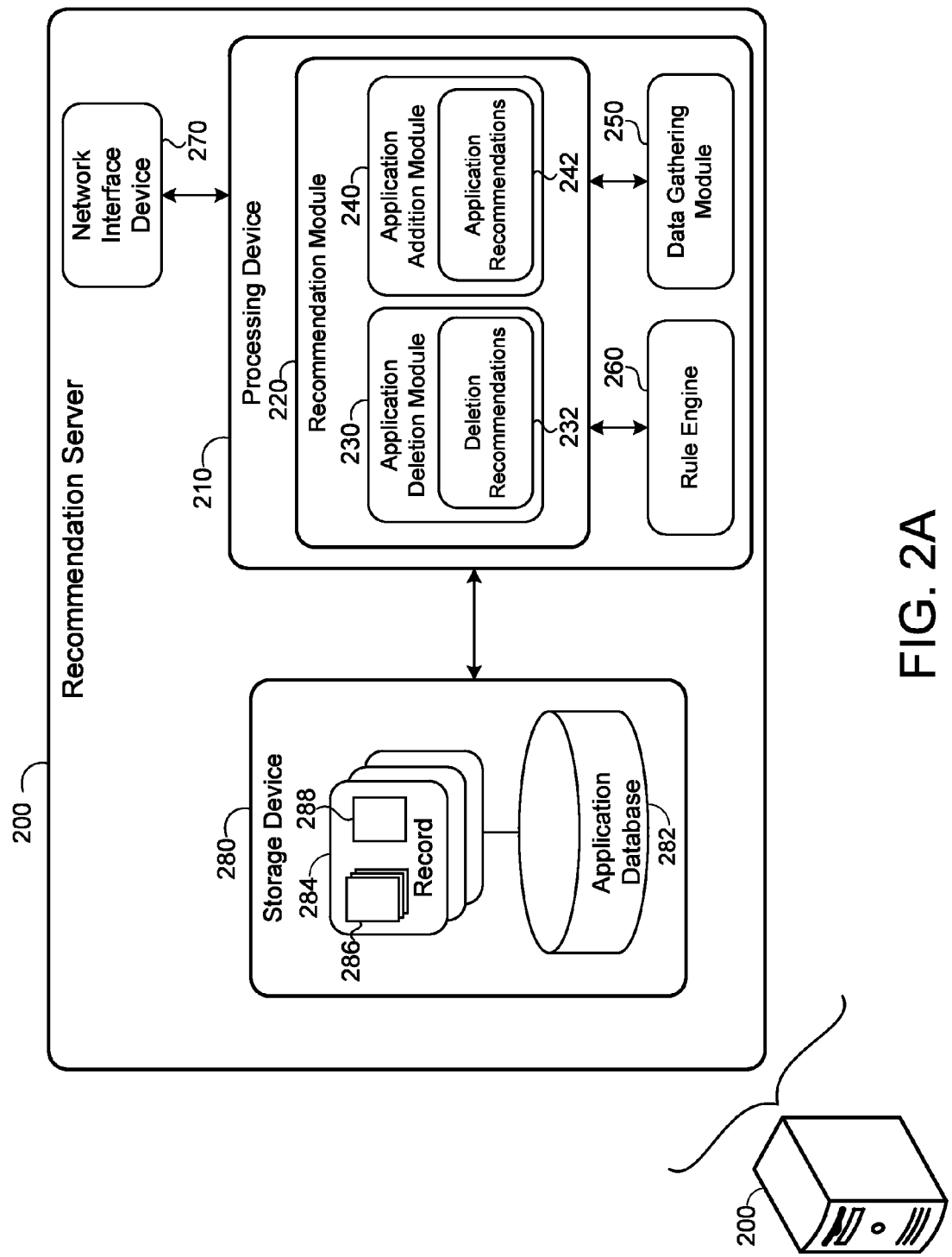
FIG. 2A is a schematic illustrating example components of a recommendation server.
Figure 2B:
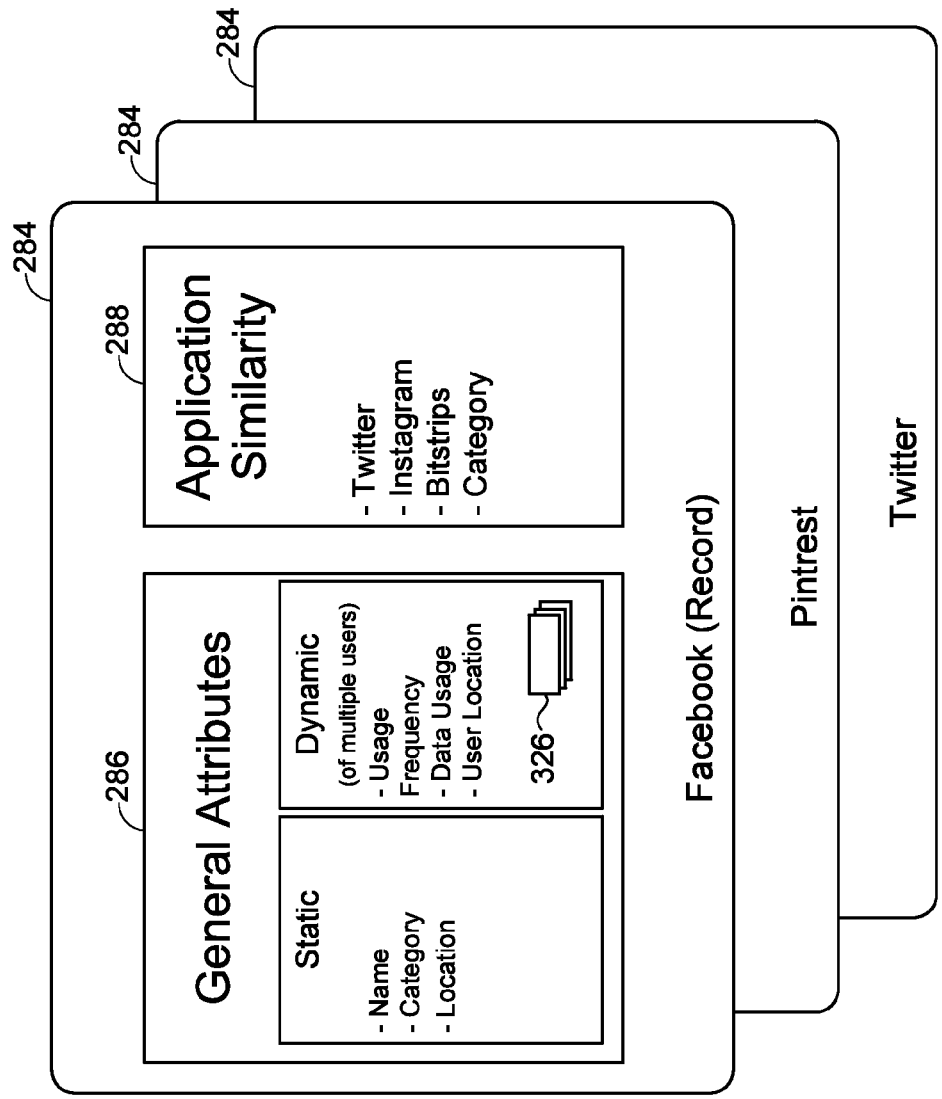
FIG. 2B is a schematic illustrating an example application record stored by the recommendation server of FIG. 2A.

FIG. 2A illustrates an example recommendation server 200 showing components of the recommendation server 200 and FIG. 2B illustrates an example of an application record 284 that can be stored by the recommendation server 200.

In some implementations, the recommendation server 200 may include a processing device 210 (e.g., computing device) in communication with a storage device 280 (e.g., non-transitory memory) and a network interface device 270. The processing device 210 can execute a data gathering module 250 that gathers information from the multiple sources and users 30 and stores the gathered data on the storage device 280. In some implementations, the processing device 210 may also execute a recommendation module 220. The recommendation server 200 may include additional components not shown in FIG. 2A.

The processing device 210 includes one or more physical processors that execute computer-readable instructions (e.g., executable computer code) and memory (e.g., RAM and/or ROM) that stores the computer-readable instructions. In implementations where the processing device 210 includes two or more processors, the two or more processors can operate in an individual or distributed manner. In some implementations, some of the executed components are implemented at different physical devices or locations. For instance, the recommendation module 220 may execute at a first location/device and the data-gathering module 250 may execute at a second location/device.

The network interface device 270 includes one or more devices that can perform wired or wireless (e.g., WiFi or cellular) communication. Examples of the network interface device 270 include, but are not limited to, a transceiver device configured to perform communications using the IEEE 802.11 wireless standard, an Ethernet port, a wireless transmitter, and a universal serial bus (USB) port.

The storage device 280 can include one or more computer readable storage mediums (e.g., hard disk drives and/or flash memory drives). The storage media can be located at the same physical location or device or at different physical locations or devices. The storage device 280 can store an application database 282. The application database 282 can store a plurality of application records 284, whereby each application record 284 corresponds to a different application 322. Each application record 284 can include one or more application attributes 286 of the corresponding application 322. In some implementations an application record 284 can also include a list of similarity indicators 288 that indicate similar applications 322. Similar applications 322 are applications 322 that have been previously determined to provide similar functionality as the application 322 corresponding to the application record 284. For example, the recommendation server 200 compares application attributes 286 and/or user specific attributes 326 of a specific application 322 with those of other applications 322 and determines applications 322 that are similar to the specific application 322.

Application records 284 can be specific to application editions (e.g., Facebook® for iOS, Facebook® for Android, Angry Birds® for iOS free, Angry Birds® for Android free, Angry Birds® for Android Ad-free, etc.) or the application records 284 can correspond to canonical applications (e.g., one record 284 for all Facebook® applications, one record 284 for all Angry Birds® applications, one record 284 for all Angry Birds Rio® applications, etc.).

Application attributes 286 of an application 322 may be static or dynamic. Static attributes are attributes 286 of the application 322 that are unlikely to change over a period of time. Static attributes may include, but are not limited to, one or more of a name attribute (i.e., the name of the application 322), an application size attribute (i.e., an amount of space required for the application 322), a category attribute (i.e., a category of the application 322), expected rate of usage attribute (i.e., how often the application publisher expects a user 30 to launch the application 322 over a period of time), a publisher name attribute, application version attribute, and a geographic relevance of the application 322 (i.e., a location where use of the application 322 is intended). Dynamic attributes are attributes 286 of the application 322 that can vary over time based on users' usage of the application 322. Dynamic attributes are based on data received from user devices 300 and can be learned over time. Dynamic attributes may include, but are not limited to, an actual usage-frequency attribute (i.e., how often the average user 30 launches the application 322), a current deletion trend attribute (i.e., how often the application 322 is being deleted over a recent period of time), an actual memory requirements attribute (i.e., how much memory is the application 322 actually using on average), and a data usage attribute (i.e., how much bandwidth does the application 322 use on average). The dynamic attributes of an application 322 can be determined by collecting user-specific attributes 326 from many different user devices 300 that have the application 322 installed thereon and aggregating the collected user-specific attributes 326.

The data gathering module 250 collects data from various sources, including, but not limited to social media, Webpages, application stores, and blogs and extracts application attributes 286 of an application 322 based on the collected data. The data gathering module 250 may systematically crawl the World Wide Web and retrieve data that is pertinent to the application 322. After retrieving the data, the data-gathering module 250 identifies application attributes 286 within the collected data and stores the application attributes 286 as part of an application record 284 on the storage device 280. For example, the data-gathering module 250 can crawl an application store to determine a name of an application 322, the publisher of an application 322, a geographic relevance of an application 322, and a size of an application 322. The data gathering module 250 populates the application record 284 of the application 322 with the extracted application attributes 286.

The data-gathering module 250 can also receive user-specific attributes 326 from multiple user devices 300 pertaining to an application 322 and extract application attributes 286 of the application 322 based on the user-specific attributes 326. The data gathering module 250 receives user-specific attributes 326 from a plurality of user devices 300 to determine how often users 30 are using the application 322 and/or how often users 30 are deleting the application 322. As the data receives user-specific attributes 326 of an application 322, the data gathering module 250 can update the dynamic attributes 286 of the application record 284 of the application 322 with extracted application attributes 286.

In some implementations, the recommendation module 220 receives a list of applications 322 currently installed on a user device 300 and the user-specific attributes 326 of each application 322 identified in the list. For each application 322 in the list, the recommendation module 220 determines whether to recommend deletion of the application 322 based on the application attributes 286 of the application 322 and the user-specific attributes 326 of the application 322. Put another way, the recommendation module 220 analyzes the user's use of the application 322 on the user device 300 and determines whether to recommend deletion of the application 322 based on the user's use of the application 322.

In some implementations, the recommendation module 220 includes a rules engine 260 that makes deletion recommendations based on the user-specific attributes 326 and one or more rules defined by the rule engine 260. The rule engine 260 receives the user-specific attributes 326 of an application 322 and applies individual user-specific attributes 326 to the rules in order to determine whether to recommend the application 322 for deletion. A rule can define one or more conditions for which to recommend deletion of an application 322. The rules engine 260 recommends deletion of the application 322 when one or more of the user-specific attributes 326 satisfy one or more conditions defined by the rules. The rules can be specific to an application 322 (e.g., rules specific for the Facebook® application) or can be generic (e.g., rules that apply to all applications 322). For instance, an application specific rule can be: "If the user logs into the Facebook® application less than one time in the last month, then recommend the application 322 for deletion." Similarly, a generic rule can be: "If the application 322 takes up more than 10% of the total memory on the user device 300, then recommend the application 322 for deletion." In the case of the application specific rules, the values defined in the rules can be learned from the application attributes 286 of the application 322. For example, if the application attributes 286 of the Facebook® application 322 indicate that the average user 30 uses the Facebook® application once a day with a standard deviation a, the rule can be generated based on the average usage and the standard deviation. The generic rules can also be learned based on data learned about users 30 over time. For example, the data-gathering module 250 may observe the size of applications 322 that users 30 delete the most. Based on these observations, a rule can be based on the average user's deletion habits with respect to application sizes. Additionally or alternatively, the rules can be hard coded by a developer.

In another example, the rules engine 260 can consider the usage-frequency attribute 326 of an application 322 installed on the user device 300, such that when the usage-frequency is less than a threshold, the recommendation module 220 recommends the application 322 for deletion. However, if the user usage-frequency attribute 326 of the application 322 on the user device 300 is greater than the threshold, the recommendation module 220 may consider another user-specific attribute 326 (e.g., data usage attribute) or general attribute 286 (e.g., size of application 322) to determine if the application 322 should be recommended for deletion. The recommendation module 220 may execute the recommendation rules on the recommendation server 200 or the user device 300. In some examples, the rules may be application specific. For example, average users 30 may access Facebook® twenty times in one day, but may only access the BankofAmerica® application once a week. Therefore, the threshold for usage-frequency is different for the two applications 322.

In another example, the rules engine 260 considers a location of a user device 300 when determining whether to recommend an application 322 for deletion. As discussed, some applications 322 may have geographic significance. For these applications 322, the rules engine 260 can compare the location of the user device 300 to the geographic attribute of the application 322 to determine whether to recommend the application 322 for deletion. When the location of the user device 300 does not correspond to the geographic attribute of the application 322, the rules engine 260 can recommend deletion of the application 322. For example, if a Washington D.C. transit application 322 provides bus and metro schedules for the Washington D.C. public transit system, the application 322 is really only relevant to Washington D.C. In this example, the location attribute of the application 322 can indicate that the application 322 is specific to Washington D.C. When the user-specific attributes 326 of the user device 300 indicate that the user device 300 is in Mountain View, Calif., the rules engine 260 can determine that the Washington D.C. transit application 322 should be recommended for deletion. As will be discussed later, in some examples, the recommendation module 220 informs the user 30 of the reason for deletion recommendations 232 and/or application recommendations 242. In this case, the recommendation module 220 may trigger the user device 300 to display a message informing the user 30 that the recommendation for deletion is because the user 30 is no longer in Washington D.C.

In some implementations, the rules engine 260 considers a deletion trend of an application 322 (e.g., the difference between the number of application downloads over a period of time and the number of application deletions over a period of time). As users 30 delete an application 322 from, or install an application 322 on, a user device 300, the user devices 300 report the deletion or addition of the application 322 in the respective user-specific attributes 326 provided to the recommendation server 200 by the user devices 300. The data-gathering module 250 can accumulate the deletions and additions of the application 322 to determine the deletion trend of the application 322. When the rules engine 260 determines that the value of the deletion trend of the application 322 is greater than a threshold, the rules engine 260 can recommend the application 322 for deletion. For example, the recommendation module 220 can subtract the number of downloads in the past twenty-four hours from the number of deletions in the past twenty-four hours to obtain the deletion trend of the application 322 over the past twenty-four hours. If the deletion trend is greater than a deletion trend threshold (e.g., >100,000), then the rules engine 260 can recommend the application 322 for deletion. In this way, if the deletion trend of an application 322 indicates that a massive amount of users 30 are deleting the application 322, the recommendation module 220 can notify other users 30 of this trend. For example, a user 30 might have downloaded an application 322 that is later found out to contain spyware. As this information is known, other users 30 may begin to delete the application 322 from their respective devices 300. By monitoring the deletion trend of the application 322, the recommendation module 300 can provide a recommendation to delete the application 322 to the user 30.

The rules provided herein are provided as an example of rules. The rules engine 260 may learn additional rules over time based on the user-specific attributes 326 that are collected by the data-gathering module 250 over time. Additionally, as developers identify other conditions that users 30 may find helpful in making the decision to delete an application 322, these conditions can be coded into rules and implemented by the rules engine 260.

Furthermore, the rules can be more complex rules that take more than one user-specific attribute 326 into context. For example, if the user 30 has not used a photo-editor application 322 in more than a month and the amount of memory used by the photo-editor application 322 is more than 1% of the available memory of the device 300 and the bandwidth usage is over 500 MB per month, the rules engine 260 can recommend the photo-editor application 322 for deletion. The complex rules can be hard coded by a developer and/or learned by a machine learner over time. Furthermore, in some implementations, a series of rules can be implemented into a decision tree that determines whether to recommend an application 322 for deletion based on the user-specific attributes 326 of the application 322. The rules in the decision trees and/or the outcomes can be hard coded by a developer or learned by a machine learner over time. In some examples, the rule are specified by the user 30.

The recommendation module 220 can feed the user-specific attributes 326 of each application 322 into the rules engine 260. Each time the rules engine 260 determines that an application 322 should be recommended for deletion, the rules engine 260 can record the reason for deletion (e.g., the application 322 has not been used in the past 60 days or the application 322 is taking up too much disk space). In some implementations, when an application 322 is recommended for deletion, the recommendation module 220 can retrieve the identifiers of similar applications 322 to the application 322 recommended for deletion from the application record 286 of the application 322 recommended for deletion. For example, the application record 286 of the Pandora® application may indicate that the iHeartRadio® application is a similar application 322. Thus, when the Pandora® application is recommended for deletion, the recommendation module 220 can retrieve an identifier of the iHeartRadio® application and can recommend the iHeartRadio® application as a substitute for the Pandora® application. The recommendation module 220 can then provide a list of applications 322 recommended for deletion to the user device 300 and can further provide the reasons that each application 322 was recommended for deletion and potential substitutes for the application 322.

While a rules based recommendation approach is described, the recommendation module 220 can determine whether to delete an application 322 in any other suitable manner. For example, the recommendation module 220 can determine a score for each application 322 installed on a user device 300 based on the application attributes 286 of the application 322 and the user-specific attributes 326 pertaining to the application 322. In some examples, the information about a user deletion of an application 322 can be used to train a machine-learned model. The machine learned model uses the attributes (e.g., application attributes 286 and/or user specific attributes 326) to generate a score for each application 322 installed on a user device 300, where one of the user attributes 326 indicates if and when previous users deleted the application 322 from their respective devices 300. Each application 322 that is deleted from a user device 300 can use the current-values of the user-specific attribute 326 with a 1, or a 100% chance to delete. Applications 322 which are not deleted can be used as a 0 or 0% chance to delete; therefore, the combination provides training data that can be used to build a machine-learned model.

Figure 3A:
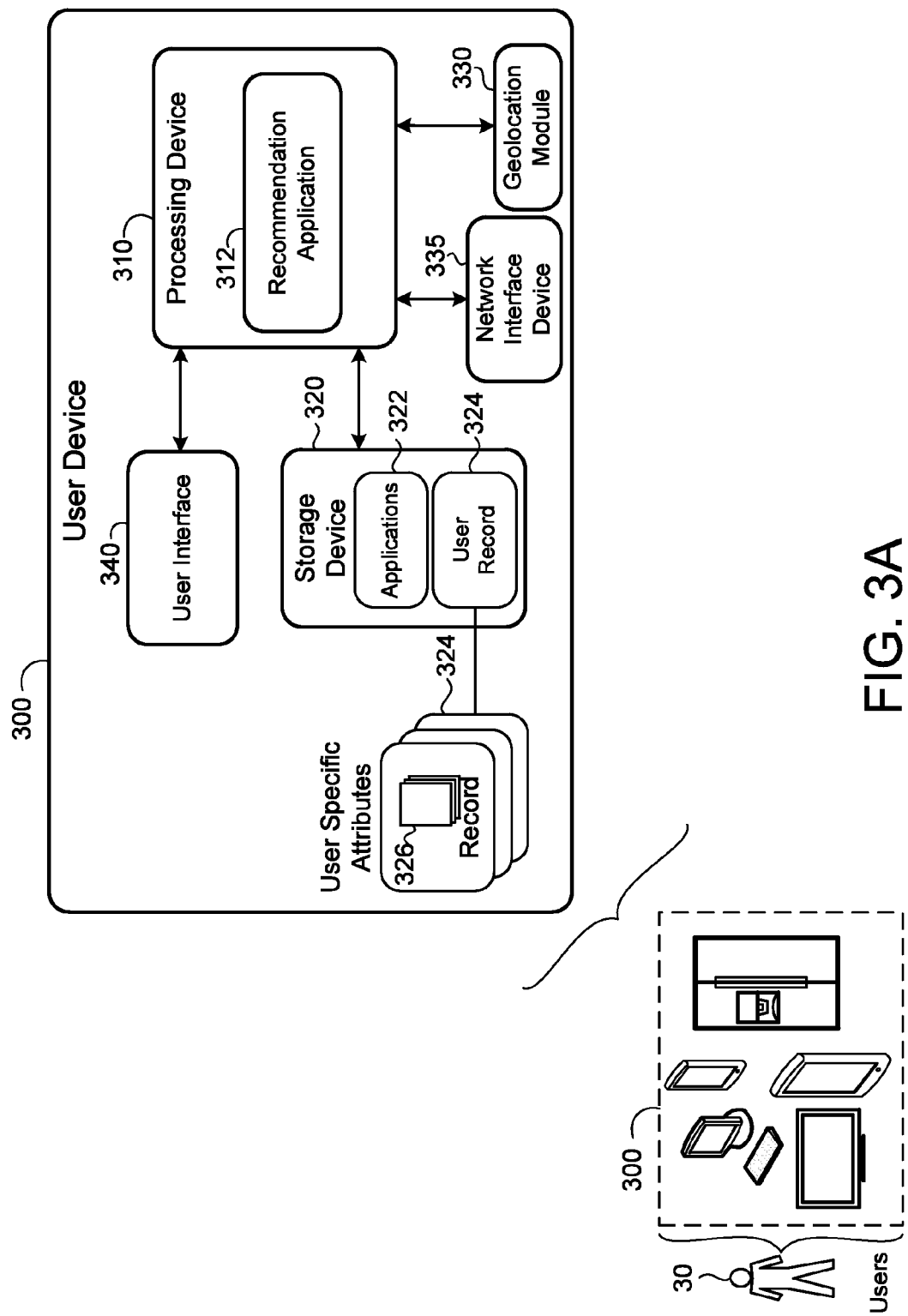
FIG. 3A is a schematic illustrating an example user device in communication with a recommendation server.
Figure 3B:
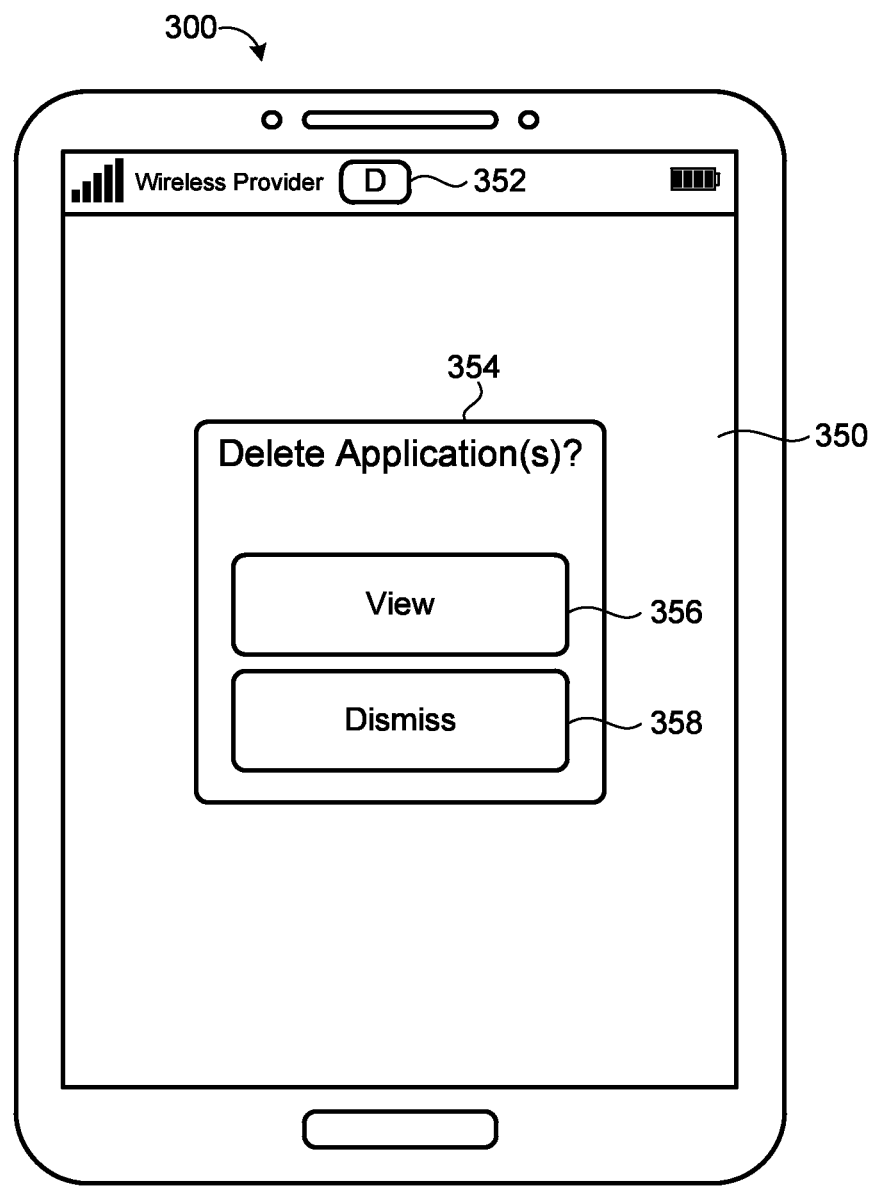
FIGS. 3B-3E are drawings illustrating a display of a user device displaying a graphical user interface of a recommendation application.

FIG. 3A illustrates an example user device 300. The user device 300 can include a processing device 310 in communication with a storage device 320, a geolocation module 330, a user interface 340, and a network interface device 335. The user device 300 may further include other components not depicted in FIG. 3A.

The processing device 310 can include one or more processors that execute computer-readable instructions and memory (e.g., RAM and/or ROM) that stores the computer-readable instructions. When the processing device 310 includes two or more processors, the processors can execute in an individual or distributed manner. The processing device 310 can execute a recommendation application 312 as well as applications 322 installed on the device 300.

The storage device 320 can include one or more computer readable storage media (e.g., hard disk drives and/or flash memory drives). The storage device 320 can store the installed applications 322 including the recommendation application 312. Furthermore, the storage device 320 can store user-specific attributes 326 corresponding to each application 322. The storage device 320 includes user application records 324, each corresponding to an application 322 stored on the storage device 320. Each user application record 324 includes user-specific attributes 326.

The network interface device 335 includes one or more devices that are configured to communicate with the network 10. The network interface device 335 can include one or more transceivers for performing wired or wireless communication. Examples of the network interface device 335 can include, but are not limited to, a transceiver configured to perform communications using the IEEE 802.11 wireless standard, an Ethernet port, a wireless transmitter, and a universal serial bus (USB) port.

The user interface 340 includes one or more devices that receive input from and/or provide output to a user 30. The user interface 340 can include, but is not limited to, a touchscreen, a display, a QWERTY keyboard, a numeric keypad, a touchpad, a microphone, and/or speakers.

In some implementations, the geolocation module 330 includes a global positioning system (GPS) receiver. The GPS receiver receives signals from GPS satellites to determine the device's location. The GPS receiver may calculate the latitude and the longitude of the user device 300. The geolocation module 330 can determine the location of the user device 300 in other manners as well (e.g., by performing triangulation based on signals received from a cellular tower).

The recommendation application 312 is implemented as computer-readable instructions and is executed by the processing device 310. The recommendation application 312 is configured to collect user-specific attributes 326 for each application 322 installed on the device 300. In some implementations, the recommendation application 312 can include one or more background processes that monitor the usage of each application 322 and record each time the user 30 launches each application 322. Furthermore, the background processes can monitor the data usage and memory usage of each application 322. The recommendation application 312 can also obtain the location of the user device 300 from the geolocation module 330. The recommendation application 312 can transmit a request to the recommendation server 200 that includes the list of applications 322 installed on the user device 300 and the user-specific applications 326 for each application 322. In response to the list of applications 322, the recommendation application 312 can receive from the recommendation server 200 recommendations to delete one or more applications 322. The recommendation application 312 can display the deletion recommendations via the user interface 340. When the user 30 selects an application 322 for deletion, the recommendation application 312 can initiate the deletion of the application 322. In some implementations, the recommendation application 312 can display recommendations for similar applications 322 for the user 30 to try as a substitute for the deleted application 322.

In some implementations, the recommendation application 312 can provide feedback to the recommendation server 200 as to the user's decisions regarding the deletion recommendations. For example, when the user 30 elects to delete an application 322, the recommendation application 312 can report the deletion of the application 322 to the recommendation server 200. Similarly, if the user 30 elects not to delete the application 322, the recommendation server 200 can report the non-deletion of the application 322 to the recommendation server 200. These types of events can be reported as user-specific attributes 326, which the recommendation server 200 can utilize when determining the conditions of the rules.

In some implementations, the recommendation application 312 is configured to determine which applications 322 to recommend for deletion. In these implementations, the recommendation application 312 can perform some of the functionality of the recommendation server 200. The recommendation application 312 can provide the list of applications 322 installed on the user device 300 to the recommendation server 200. In response, the recommendation server 200 can provide the application records 284 for each application 322 and the rules corresponding to each application 322 to the recommendation application 312 as well as any generic rules. The recommendation application 312 can collect the user-specific attributes 326 of each application 322 and can compare the user-specific attributes 326 to the conditions identified in the rules. When the recommendation application 312 determines that an application 322 should be recommended for deletion, the recommendation application 312 can determine the reason that deletion is recommended (e.g., which condition or conditions were violated). The recommendation application 312 can display deletion recommendations on the user interface 340 and can further display the reasons that the application 322 was recommended for deletion.

In some examples, the recommendation application 312 can be configured with user settings that allow the user 30 to control specific features of the recommendation application 312. The user settings may include a feature allowing the user 30 to select the frequency at which the recommendation application 312 executes on the device 300 (e.g., once every week or once every month). In some examples, if the user 30 selects a frequency of zero, the recommendation application 312 requests recommendations from the recommendation server 200 only when the user 30 manually launches the recommendation application 312. If the frequency is greater than zero, then the recommendation application 312 can request recommendations from the recommendation server 200 at scheduled times (e.g., Monday at midnight or the first of every month).

FIGS. 3B-3E illustrate an example graphical user interface (GUI)) 350 of the recommendation application 312 that is displayed by the user interface 340. When the user 30 launches the recommendation application 312, the recommendation application 312 displays the GUI 350. When one or more applications 322 have been recommended for deletion, the recommendation application 312 can prompt the user 30 with an option to view the deletion recommendations. In the illustrated example of FIG. 3B, the GUI 350 provides an input box 354 that includes a "view" input object 356 and a "dismiss" input object 358. If the user 30 selects the view input object 356, the recommendation application 312 can display the applications 322 recommended for deletion via the GUI 350.

Figure 3C:
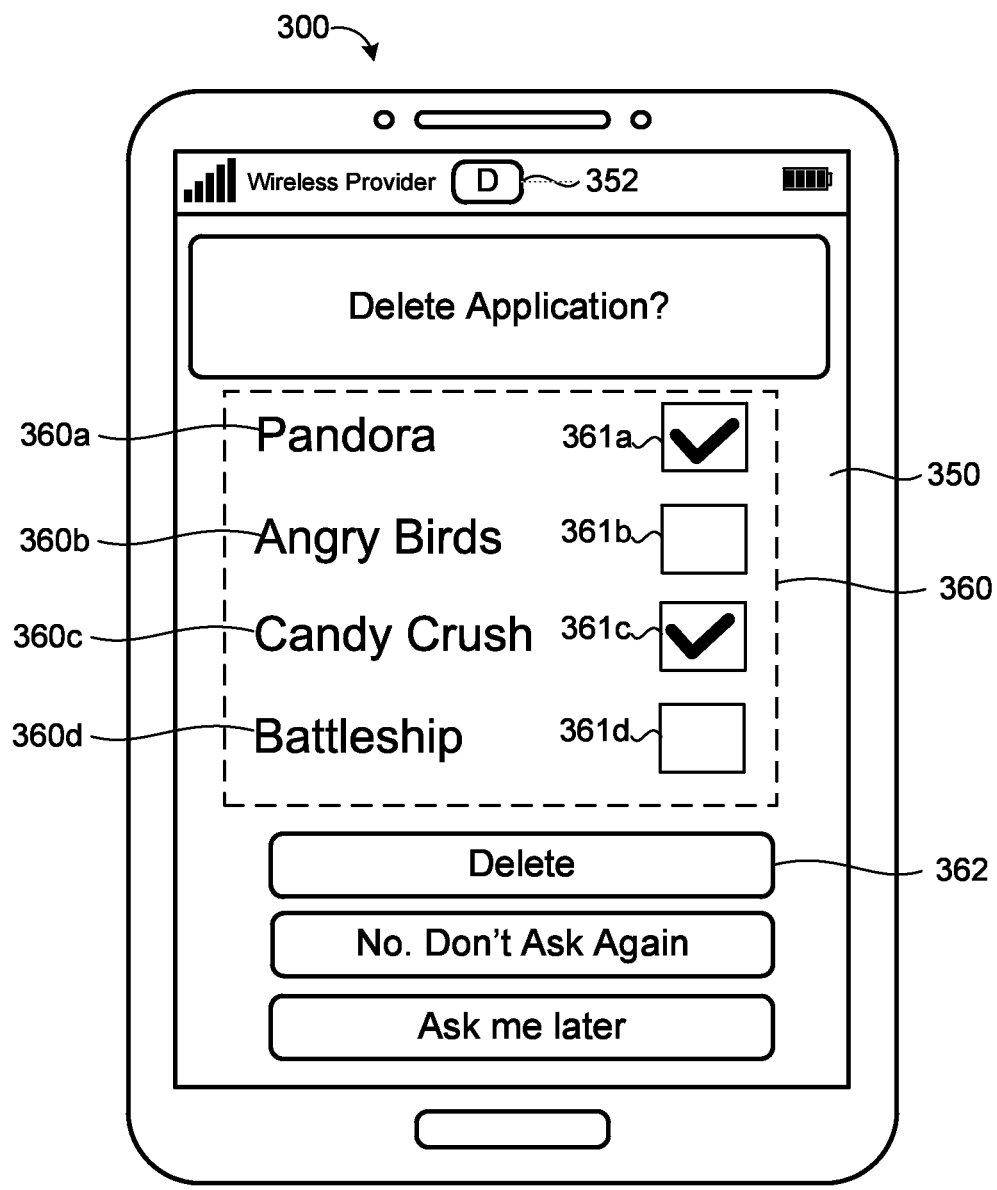

FIG. 3C illustrates an example of the GUI 350 displaying deletion recommendations 360. In the illustrated example, the GUI 350 provides input objects 361 that allow a user 30 to provide deletion selections. In this example, the user 30 has selected the Pandora® deletion recommendation 360a and the Candy Crush® deletion recommendation 360c using the respective input objects 361a, 361c. The user 30 can then press the "delete" input object 362 to initiate deletion of the selected applications 322. When the user 30 presses the delete input object 362, the recommendation application 312 initiates the deletion process of the selected applications 322.

Figure 3D:
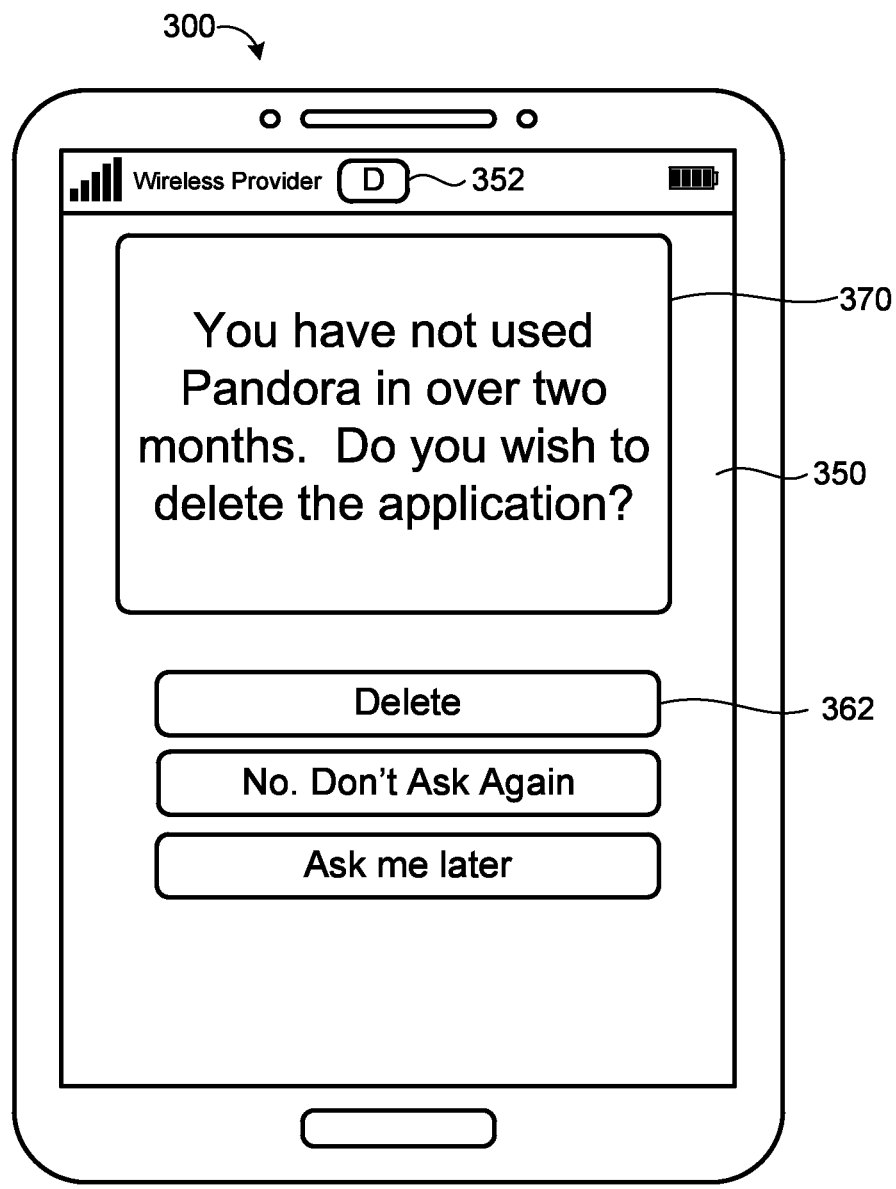

In some implementations, the user 30 can drill down onto a deletion recommendation 360 by, for example, pressing on the area corresponding to the deletion recommendation 360. For example, if the user 30 wishes to view the reasons that Pandora® was recommended for deletion, the user 30 can press on the Pandora® deletion recommendation 360a. FIG. 3D illustrates an example of the GUI 350 displaying a reason 370 for recommending deletion of an application 322. In the illustrated example, the GUI 350 has notified the user 30 that the Pandora® application 322 has not been used in the previous two months. The user 30 can delete the application 322 by selecting the delete input object 362.

Figure 3E:
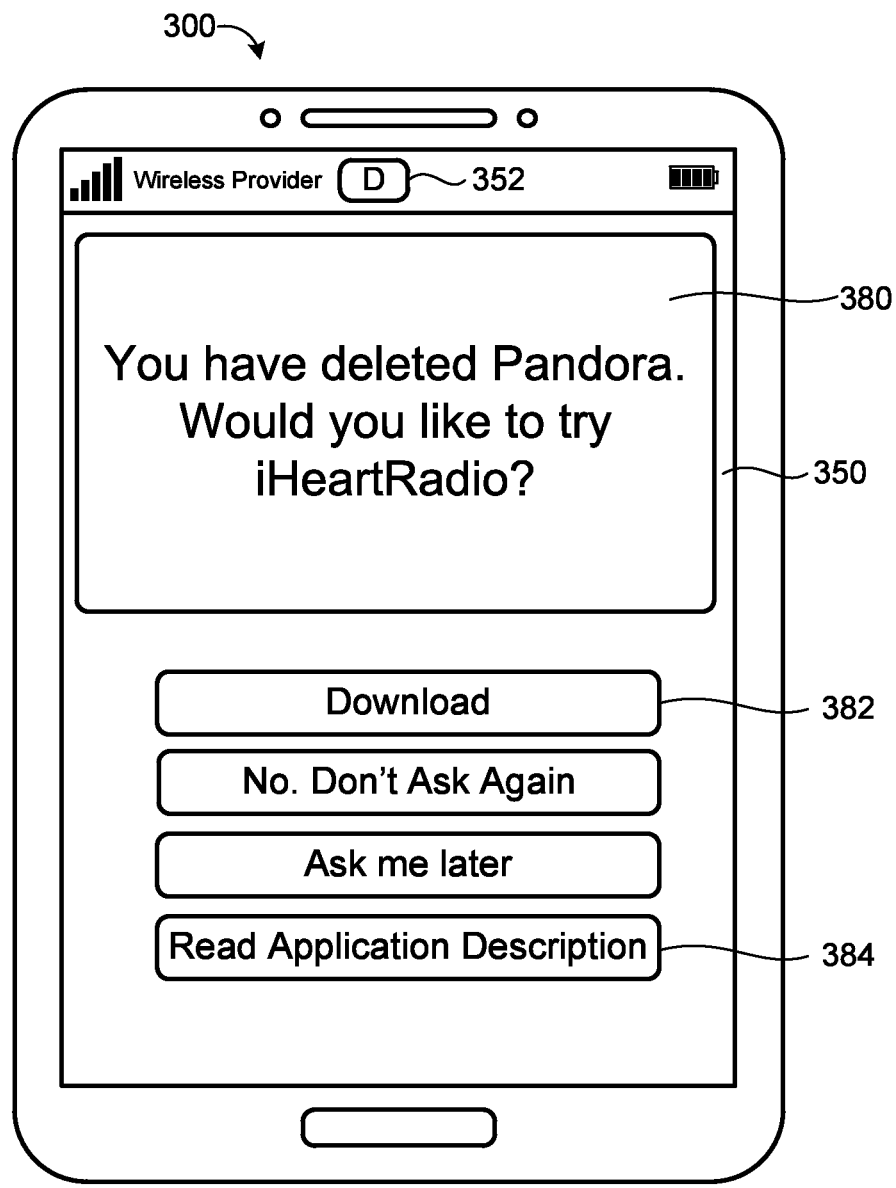

In some implementations, the recommendation application 312 can recommend substitution applications 322 for a deleted application 322 via the GUI 350. In FIG. 3E, the user 30 has opted to delete the Pandora® application 322 from the user device 300. In response to the user's decision to delete the Pandora® application 322, the recommendation application 312 can determine whether there are any applications 322 that are similar to the deleted application 322. As was described, in some implementations, each application record 324 includes a list of indicators of similar applications 322. In implementations where the recommendation server 200 provides recommendations to delete an application 322, the recommendation server 200 can provide a list of zero or more indicators of similar applications 322 to the recommendation application 312 with the recommendation to delete an application 322. In the example GUI 350, the recommendation application 312 displays an application recommendation 380 of the iHeartRadio® application in response to the user 30 opting to delete the Pandora® application. The user 30 can select the "download" input object 382 to initiate the downloading of the iHeartRadio® application. In some implementations the recommendation application 312 also provides a "read application description" input object 384. When selected by a user 30, the recommendation application 312 can display a description of the substitute application 322 (e.g., the name of the application 322, the version of the application 322, screen shots of the application 322, and a general description of the application's 322 functionality) to assist the user 30 in deciding whether to download the recommended application 322.

Figure 4:
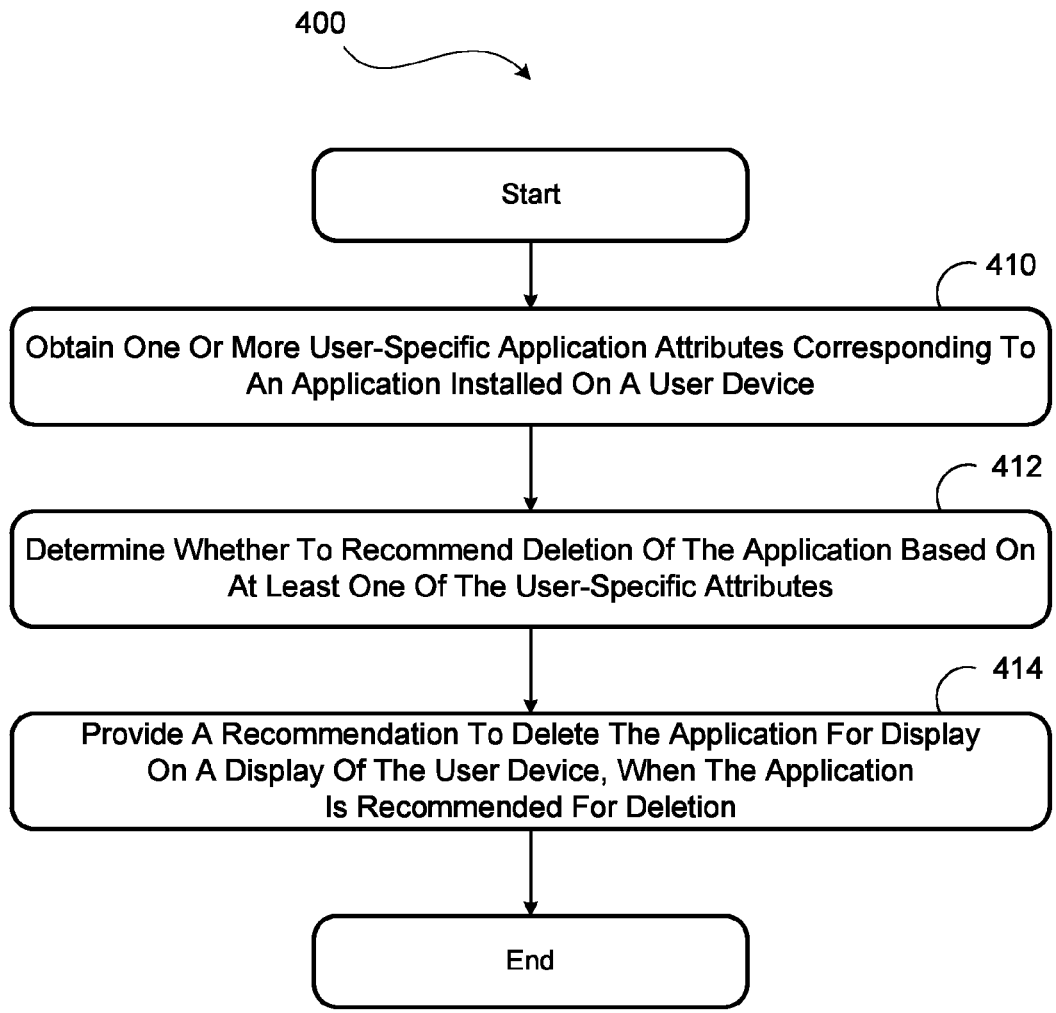
FIG. 4 is a flow chart illustrating an exemplary arrangement of operations of a method for recommending applications for deletion.

FIG. 4 illustrates an example arrangement of operations of a method 400 for recommending deletion of an application 322 installed on a user device 300. In some implementations, the method 400 is executed by the recommendation module 220 of the recommendation server 200. The method 400 may, however, be executed by any other suitable component.

At operation 410, the recommendation module 220 obtains one or more user-specific attributes 326 corresponding to an application 322. As previously discussed, a user device 300 sends a list of applications 322 installed on the user device 300 to the recommendation server 200, along with the user-specific attributes 326 of each application 322 identified in the list. The recommendation module 220 parses the list to identify each application 322 and its corresponding user-specific attributes 326. As previously described, the user-specific attributes 326 may include, a usage-frequency attribute, a location attribute, a data usage attribute, a time of last use attribute, and an available disk space attribute.

At operation 412, the recommendation module 220 determines whether to recommend deletion of the application 322 based on at least one of the user-specific attributes 326. In some examples, the recommendation module 220 feeds the user-specific attributes of the application 322 into a rules engine 260. The rules engine 260 can analyze the user-specific attributes 326 using one or more rules to determine if any conditions for recommending deletion are met by the user-specific attributes 326. As previously discussed, rules can include a single condition and/or multiple conditions. Further, the rules can be specific to a particular application 322 and/or can be general rules. When the user-specific attributes 326 of the application 322 satisfy the condition or conditions of a rule, the rules engine 260 recommends that application 322 for deletion. Additionally, the rules engine 260 can identify which condition was satisfied by the rule, thereby identifying the reason for recommending the application 322 for deletion.

In other implementations, the recommendation module 220 calculates a score of the application 322 based on the user-specific attributes 326 and the application attributes 286 of the application 322. In these implementations, the recommendation module 220 can execute a scoring function that compares one or more of the user-specific attributes 326 to one or more of the application attributes 286 and determines a score based on the divergence of the user-specific attributes 326 from the application attributes 286. If the score exceeds a threshold, then the recommendation module 220 recommends the application 322 for deletion.

At operation 414, the recommendation module 220 provides a recommendation to delete the application 322 to the user device 300. When the recommendation module 220 determines that no applications 322 should be recommended for deletion, the recommendation module 220 can return an empty set to the user device 300. The recommendation module 220 provides a recommendation to delete the application 322 only when it determines that the application 322 should be recommended for deletion. In some implementations, the recommendation module 220 can identify similar applications 322 to recommend as substitutes for the application 322. In some of these implementations, the recommendation module 220 retrieves the list 288 of similar applications 322 from the application record 284 corresponding to the application 322. The recommendation module 220 can then transmit the recommendation to delete the application 322 to the user device 300 via the network 10. The recommendation can also transmit the reason for recommending the deletion and/or a list 288 of substitute applications 322 to the user device 300 with the recommendation to delete the application 322.

The method 400 of FIG. 4 is provided for example only and not intended to limit the scope of the disclosure. Additional or alternate operations may be performed without departing from the scope of the disclosure. Further, in some implementations the method 400 can be altered such that it can be executed by the recommendation application 312 of the user device 300. In these implementations, the recommendation application 312 can provide a list of applications 322 installed on the user device 300 to the recommendation server 200. The recommendation server 200 can provide the application records 284 and the rules pertaining to the list of applications 322 to the user device 300. The recommendation application 322 can then obtain the user-specific attributes 326 of each application 322 and determine whether to recommend deletion of the applications 322 based on the user-specific attributes 326 and the rules.

Figure 5:
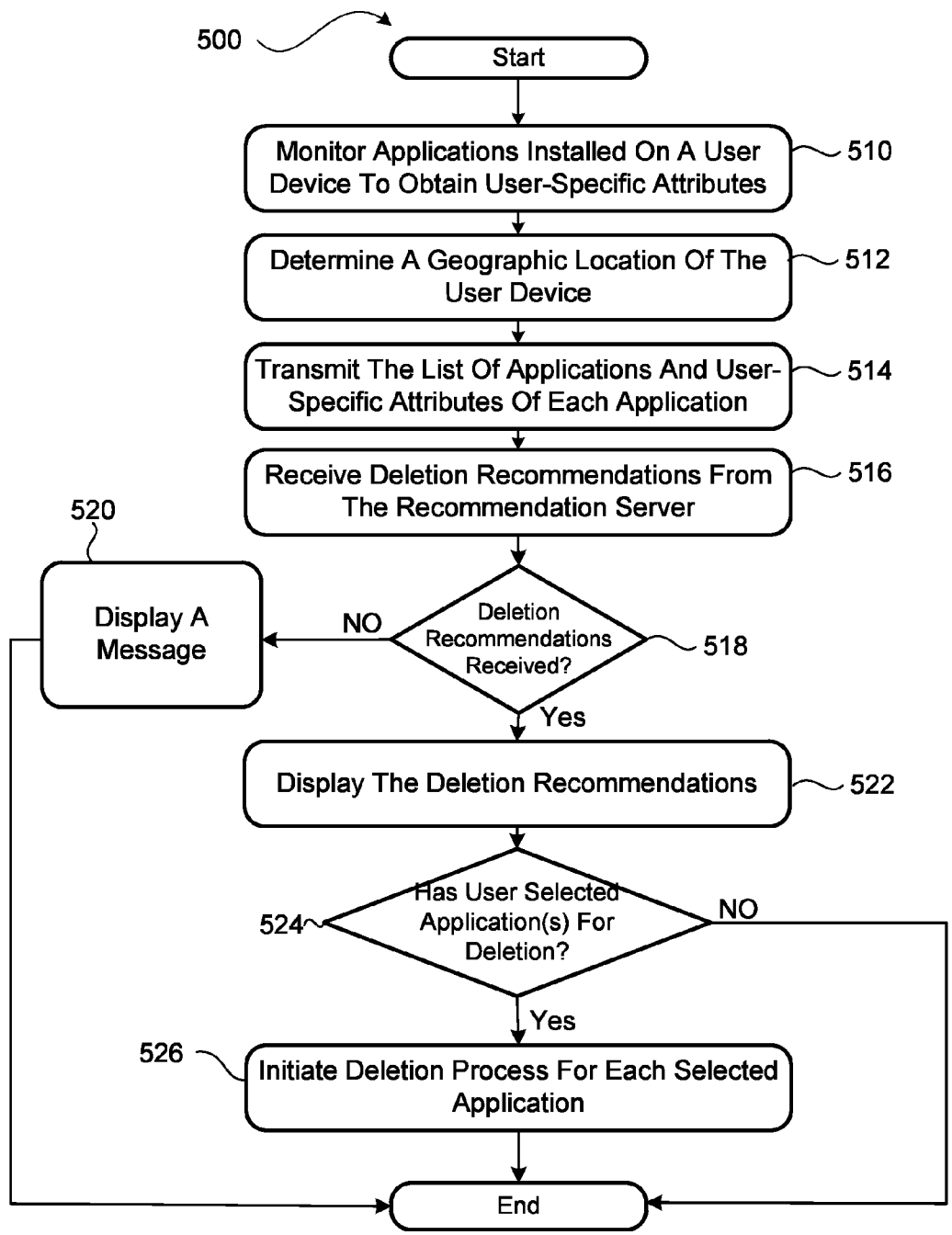
FIG. 5 is a flow chart illustrating an exemplary arrangement of operations of a method for organizing applications installed on a user device.

FIG. 5 illustrates an example arrangement of operations of a method 500 for organizing the applications 322 installed on a user device 300. The method 500 may be implemented by the recommendation application 312.

At operation 510, the recommendation application 312 monitors the applications 322 installed on the user device 300 to obtain user-specific attributes 326 of each application 322. For each application 322, the recommendation application 312 records each time the user 30 launches the application 322. The recommendation application 312 also monitors how much bandwidth each application 322 consumes over a period of time (e.g., over the previous month) and how much disk space the application 322 is using. At operation 512, the recommendation application 312 determines a geolocation of the user device 300. In some implementations, the recommendation application 312 can obtain the GPS coordinates of the user device 300 periodically and can update the user-specific attributes 326 of each application 322 with the GPS coordinates.

At operation 514, the recommendation application 312 transmits the list of applications 322 and the user-specific attributes 326 of each application 322 to the recommendation server 200. At operation 516, the recommendation application 312 may receive deletion recommendations from the recommendation server 200. At decision block 518, the recommendation application 312 determines whether the recommendation server 200 has recommended any applications 322 for deletion. When the recommendation server 200 does not recommend any applications 322 for deletion, the recommendation server 200 may return an empty set, thereby indicating that none of the applications 322 have been recommended for deletion. In such a scenario, the recommendation application 312 can display a message to the user 30 indicating that none of the applications 322 have been recommended for deletion, as shown at operation 520.

When the recommendation server 200 recommends one or more applications 322 for deletion, the recommendation application 312 can display the deletion recommendations to the user 30 via the user interface 340, as shown at 522. As previously discussed, for each application 322 recommended for deletion, the recommendation application 312 can provide the user 30 with an option to delete the application 322. At decision block 524, the recommendation application 312 determines whether the user 30 has opted to delete any of the applications 322 recommended for deletion. If not, the recommendation application 312 can stop executing the method 500. In some implementations, the recommendation application 312 can report that the user 30 did not delete any of the applications 322 recommended for deletion 322. If, however, the user 30 has selected one or more of the applications 322 for deletion, the recommendation application 312 can initiate the deletion process for each of the selected applications 322, as shown at operation 526. The recommendation application 312 can notify the operating system of the user device 300 of the applications 322 that have been selected for deletion, and the operating system can delete the applications 322. Furthermore, the recommendation application 312 can report the applications 322 that were deleted from the user device 300 to the recommendation server 200.

The method 500 of FIG. 5 is provided for example only and not intended to limit the scope of the disclosure. Additional or alternate operations may be performed without departing from the scope of the disclosure.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
obtaining, at a processing device, one or more user-specific application attributes corresponding to an application installed on a user device, the user-specific application attributes corresponding to use of the application on the user device;
determining, at the processing device, whether to recommend deletion of the application based on at least one of the user-specific application attributes; and
when the application is recommended for deletion:
determining, at the processing device, one or more substitute applications for the application;
providing, by the processing device, a recommendation to delete the application for display on a display of the user device; and
providing, by the processing device, one or more application indicators respectively corresponding to the one or more substitute applications for display by the user device.

2. The method of claim 1, wherein determining whether to recommend deletion is further based on a rule, the rule defining one or more conditions for which to recommend deletion of the application, wherein the application is recommended for deletion when one or more of the user-specific application attributes satisfy the one or more conditions.

3. The method of claim 2, wherein at least one of the conditions is based on user-specific application attributes collected from a plurality of attributes.

4. The method of claim 2, wherein the user-specific application attributes include a location attribute indicating a location of the user device and the rule includes a geographic condition defining a geographic area to which the application corresponds, wherein the application is recommended for deletion when the location of the user device is outside of the geographic area.

5. The method of claim 2, wherein the user-specific application attributes include a usage-frequency attribute indicating a frequency of usage of the application on the user device and the rule includes a usage-frequency condition defining a usage-frequency threshold, wherein the application is recommended for deletion when the frequency of usage of the application is less than the usage-frequency threshold.

6. The method of claim 2, wherein the user-specific application attribute is an indication that the application is installed on the user device and the rule includes a trending condition, the trending condition indicates a deletion trend threshold for the application, wherein the application is recommended for deletion when a deletion trend of the application across a plurality of user devices exceeds the deletion trend threshold.

7. The method of claim 2, wherein the rule is one of a plurality of rules of a decision tree, each rule having one or more conditions defining when to recommend deletion.

8. The method of claim 1, wherein determining whether to recommend deletion of the application includes:
   determining, at the processing device, a score corresponding to the application based on the one or more user-specific application attributes; and
   selectively recommending, at the processing device, the application for deletion based on the score.

9. The method of claim 1, further comprising:
   when the application is recommended for deletion:
      determining, at the processing device, one or more reasons that the application was recommended for deletion; and
      providing, by the processing device, one or more reasons for display by the user device.

10. A recommendation server comprising:
   a storage device;
   a network interface; and
   a processing device executing computer-readable instructions, the computer-readable instructions, when executed by the processing device, causing the processing device to:
      obtain one or more user-specific application attributes corresponding to an application installed on a user device, the user-specific application attributes corresponding to use of the application on the user device;
      determine whether to recommend deletion of the application based on at least one of the user-specific application attributes; and
      when the application is recommended for deletion:
         determine one or more substitute applications for the application;
         provide a recommendation to delete the application to the user device for display on a display of the user device; and
         provide one or more application indicators respectively corresponding to the one or more substitute applications to the user device for display by the user device.

11. The recommendation server of claim 10, wherein the processing device determines whether to recommend deletion based on a rule, the rule defining one or more conditions for which to recommend deletion of the application, wherein the application is recommended for deletion when one or more of the user-specific application attributes satisfy the one or more conditions.

12. The recommendation server of claim 11, wherein the user-specific application attributes include a location attribute indicating a location of the user device and the rule includes a geographic condition defining a geographic area to which the application corresponds, wherein the application is recommended for deletion when the location of the user device is outside of the geographic area.

13. The recommendation server of claim 11, wherein the user-specific application attributes include a usage-frequency attribute indicating a frequency of usage of the application on the user device and the rule includes a usage-frequency condition defining a usage-frequency threshold, wherein the application is recommended for deletion when the frequency of usage of the application is less than the usage-frequency threshold.

14. The recommendation server of claim 11, wherein the user-specific application attribute is an indication that the application is installed on the user device and the rule includes a trending condition, the trending condition indicates a deletion trend threshold for the application wherein the application is recommended for deletion when a deletion trend of the application across a plurality of user devices exceeds the deletion trend threshold.

15. The recommendation server of claim 10, wherein the processing device determines whether to recommend deletion of the application by:
   determining, at the processing device, a score corresponding to the application based on the one or more user-specific application attributes; and
   selectively recommending, at the processing device, the application for deletion based on the score.

16. The recommendation server of claim 10, wherein the computer-readable instructions, when executed by the processing device, further cause the processing device to:
   when the application is recommended for deletion:
      determine one or more reasons that the application was recommended for deletion; and
      provide one or more reasons for display by the user device.

17. A user device comprising:
   a storage device;
   a network interface;
   a user interface including a display; and
   a processing device executing computer-readable instructions, the computer-readable instructions, when executed by the processing device, causing the processing device to:
      obtain one or more user-specific application attributes corresponding to an application installed on the user device, the user-specific application attributes corresponding to use of the application on the user device;
      determine whether to recommend deletion of the application based on at least one of the user-specific application attributes; and
      when the application is recommended for deletion:
         determine one or more substitute applications for the application;
         provide a recommendation to delete the application for display on the display of the user device; and
         provide one or more application indicators respectively corresponding to the one or more substitute applications for display on the display of the user device.

18. The user device of claim 17, wherein the processing device determines whether to recommend deletion based on a rule, the rule defining one or more conditions for which to recommend deletion of the application, wherein the application is recommended for deletion when one or more of the user-specific application attributes satisfy the one or more conditions.

19. The user device of claim 18, the computer-readable instructions, when executed by the processing device, further cause the processing device to request the rule from a recommendation server by providing an indicator of the application, wherein the recommendation server provides the rule to the user device.

20. The user device of claim 18, wherein the user-specific application attributes include a location attribute indicating a location of the user device and the rule includes a geographic condition defining a geographic area to which the application corresponds, wherein the application is recommended for deletion when the location of the user device is outside of the geographic area.

21. The user device of claim 18, wherein the user-specific application attributes include a usage-frequency attribute indicating a frequency of usage of the application on the user device and the rule includes a usage-frequency condition defining a usage-frequency threshold, wherein the application is recommended for deletion when the frequency of usage of the application is less than the usage-frequency threshold.

22. The user device of claim 18, wherein the user-specific application attribute is an indication that the application is installed on the user device and the rule includes a trending condition, the trending condition indicates a deletion trend threshold for the application, wherein such that the application is recommended for deletion when a deletion trend of the application across a plurality of user devices exceeds the deletion trend threshold.

23. The user device of claim 17, wherein the processing device determines whether to recommend deletion of the application by:
  determining, at the processing device, a score corresponding to the application based on the one or more user-specific application attributes; and
  selectively recommending, at the processing device, the application for deletion based on the score.

24. The user device of claim 18, wherein the computer-readable instructions, when executed by the processing device, further cause the processing device to:
  when the application is recommended for deletion:
    determine one or more reasons that the application was recommended for deletion; and
    provide one or more reasons for display by the user device.

* * * * *